March 29, 1938.   N. D. REYNOLDS   2,112,709
DEVICE FOR KEEPING WINDSHIELDS CLEAR
Filed July 20, 1937   2 Sheets-Sheet 1
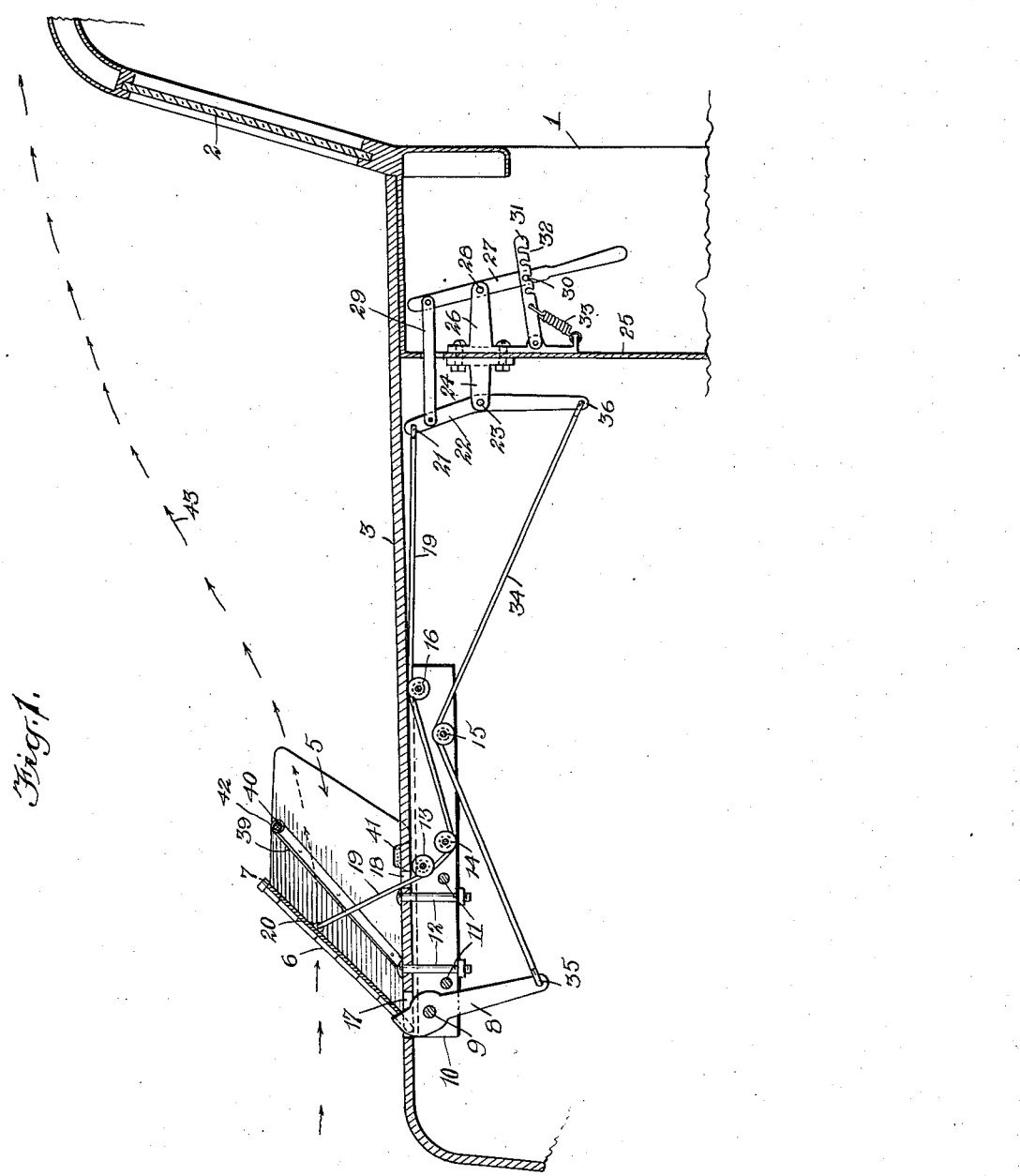
WITNESSES
INVENTOR
Noble D. Reynolds
BY
ATTORNEYS March 29, 1938. N. D. REYNOLDS 2,112,709
DEVICE FOR KEEPING WINDSHIELDS CLEAR
Filed July 20, 1937 2 Sheets-Sheet 2
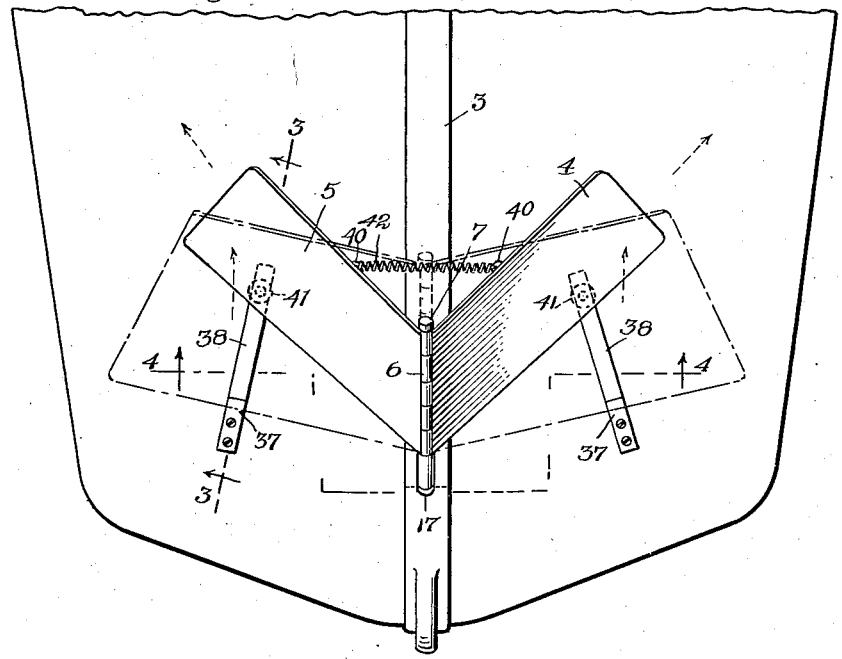
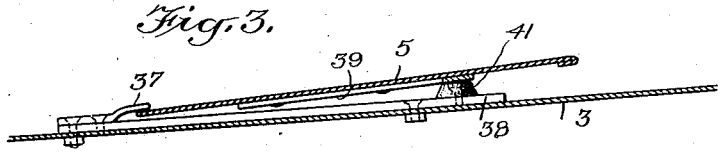
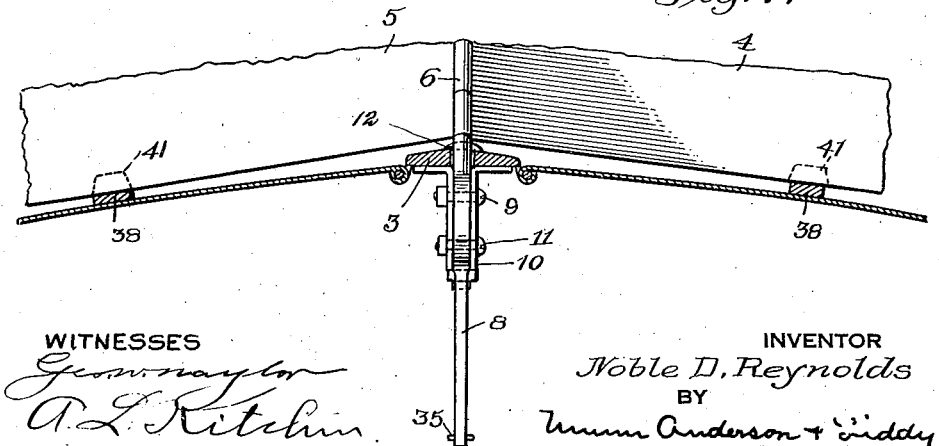
WITNESSES
INVENTOR
Noble D. Reynolds
BY
Anderson + Siddy
ATTORNEYS Patented Mar. 29, 1938

2,112,709

UNITED STATES PATENT OFFICE 2,112,709

DEVICE FOR KEEPING WINDSHIELDS CLEAR

Noble D. Reynolds, Denver, Colo.

Application July 20, 1937, Serial No. 154,567

4 Claims. (Cl. 296—84)

This invention relates to an improved device for keeping windshields of automobiles clear, the object being to provide a construction which will function efficiently to prevent insects, rain or snow, or other objects striking the windshield when the automobile is traveling at an appreciable speed.

Another object of the invention is to provide a windshield protecting device which may be moved to functioning position from the driver's seat in an automobile or to a non-functioning position.

In the accompanying drawings:

Fig. 1 is a longitudinal vertical sectional view through the upper forward part of an automobile with a device embodying the invention applied thereto and shown partly in elevation and partly in section;

Fig. 2 is a top plan view of the construction shown in Fig. 1;

Fig. 3 is an enlarged fragmentary sectional view through Fig. 2 on the line 3—3;

Fig. 4 is an enlarged fragmentary sectional view through Fig. 2 on the line 4—4.

Referring to the accompanying drawings by numerals, 1 indicates an automobile of any desired kind provided with a suitable windshield 2 and a hood 3. In driving through snow or rain the windshield 2 often becomes so covered with rain or snow that it is objectionable even with the use of a conventional windshield wiper now in common use. Under some circumstances moths or other insects strike the windshield and produce an undesirable condition thereon. To avoid all of these objections and to maintain the windshield in a substantially clear condition at all times an improved device for deflecting oncoming objects to a point above the windshield has been disclosed in the accompanying drawings.

This device includes a pair of plates 4 and 5 presenting a wing structure hinged together at 6 and provided with a pintle 7 having the lower end extending into the upper end of the lever 8 as shown in Fig. 1. Preferably the lower end of the pintle 7 is soldered, welded or otherwise rigidly secured to the upper end of lever 8, which lever is pivotally mounted on a pin 9 carried by a pair of angle bars 10. The angle bars 10, as shown in Fig. 4, are held against separation by suitable bolts 11 and clamped to the center of the automobile hood 3 by suitable bolts 12 (Fig. 1). The bolts not only clamp the angle bars in place but also separate the same so that the various pulleys 13, 14, 15 and 16 may freely rotate. The hood 3 is provided with apertures 17 and 18 whereby the upper end of lever 8 may function properly and also whereby the cable 19 may slide through the hood 3. This cable is secured to the hinge formation 6 by being tied or otherwise rigidly secured to a bracket 20 connected to one of the knuckles of the hinge. The cable 19 may be any kind of a non-stretchable cable, as for instance a piece of wire. This cable passes over pulleys 13, 14 and 16 and is secured at 21 to the lever 22 which is pivotally mounted at 23 on bracket 24. Bracket 24 is bolted or otherwise rigidly secured to the fire wall 25 or to some other part of the automobile. A second bracket 26 is preferably secured by the same bolts as bracket 24. Hand lever 27 is pivotally mounted at 28 on bracket 26 and may be swung back and forth when released from catch 31. Rod or bar 29 is pivotally connected to the upper end of lever 27 and also to the lever 22 so that these levers will move more or less in unison. A pin 30 is carried by lever 27 and is adapted to receive the locking member or catch 31 which is supplied with notches 32 for accommodating the pin 30. A retractile spring 33 acts to hold the member 31 interlocked with pin 30.

As shown in Fig. 1, a second cable of wire or other material 34 is connected at 35 to the lever 8 and at 36 to the lever 22 whereby the cables 19 and 34 will operate in unison but in opposite directions. As the upper end of lever 8 is rigidly secured to the pintle 7, the pintle and the hinge 6 will swing with lever 8. When the hand lever 27 is swung to the left as shown in Fig. 1, cable 19 will pull on the hinge 6 until the wings 4 and 5 will substantially collapse or move flatwise against the hood 3 so as not to present any obstruction. As the wings move downwardly they will naturally swing open and slide under the respective fixed brackets or catches 37 secured to the respective plates or bars 38, which in turn are bolted or otherwise secured to the hood 3. A strip 39 is also secured to each of the wings and this strip is arranged so that the end portion 40 will strike the bumper 41 which is formed of rubber or other resilient material and which is bolted or otherwise rigidly secured to the plate 38. This prevents rattling of the various parts when they are moved to a non-functioning position. When the parts are in non-functioning position they will be arranged substantially as shown in Figs. 3 and 4 and as shown in dotted lines in Fig. 2. If desired, a retractile spring 42 may be used to assist in bringing the wings to an upper position as shown in Figs. 1 and 2. This is the functioning position and consequently when the automobile is traveling at some appreciable speed, as for instance twenty miles per hour or faster, insects will strike the wings and be deflected upwardly as indicated by the arrows 43 in Fig. 1. Rain or snow under ordinary circumstances will likewise be deflected upwardly and windshield 2 will thereby be maintained clear.

In operation, when the parts are in the position shown in Fig. 1 the device is functioning fully. In case the device should not be needed, lever 27 is grasped and member 31 raised, after which lever 27 is swung forwardly and this will cause the cable 19 to pull the wings and associated parts downwardly until they will lie substantially flat against the hood 3 as illustrated in Figs. 3 and 4. Whenever the device is again desired it is only necessary to swing lever 27 back to the position shown in Fig. 1.

I claim:

1. A device of the character described comprising a pair of wings, means for hinging the same together, means for pivotally mounting the wings on the hood of an automobile, hand operated means to function to raise said wings until they will be at a substantial angle to the surface of the hood of the automobile, means including a lever and cable for swinging said wings downwardly until they lie substantially flat against the hood of the automobile, and means for automatically locking the hand operated means against functioning.

2. A device of the character described comprising a pair of substantially rectangular plates forming a pair of wings, means for hinging said plates together end to end, a pivotally mounted lever secured to the pintle of said hinge means, a cable for swinging said lever in one direction, a cable for swinging said pintle and associated parts in the opposite direction for causing said wings to lie substantially flat against the hood of an automobile, a hand actuated lever for causing said cables to function, and means for preventing said wings from rattling when moved to a position substantially parallel with the top of the hood of the automobile.

3. A device of the character described including a pair of wings hingedly connected together, a pivotally mounted lever rigidly secured to the pintle of the hinge connection, means for pivotally mounting said lever on the hood of an automobile, a cable for moving said lever in one direction for causing said pintle to be raised at an appreciable angle to the upper surface of the hood of the automobile, a cable for moving said wings to a position substantially flatwise against the upper surface of the hood of the automobile, and a hand actuated lever for causing said cables to function.

4. A device of the character described including a pair of angle irons, a pair of bolts positioned to space said angle irons and secure the angle irons to the undersurface of the hood of an automobile, bolts for clamping said angle irons against the first mentioned bolts, a lever pivotally mounted on said angle irons, a pair of wings arranged on top of the hood of said automobile, a hinge structure including a pintle for connecting said wings together, one end of said pintle being rigidly secured to said lever so as to swing therewith, a cable for swinging said lever in one direction, a cable for swinging said pintle and associated parts in the opposite direction including said lever, guiding pulleys carried by said angle irons for guiding said cables, and a hand actuated structure for pulling either of said cables and slacking the other cable whereby said wings may be raised to a functioning position or lowered to a non-functioning position.

NOBLE D. REYNOLDS.